United States Patent
Liao et al.

(10) Patent No.: US 10,486,723 B2
(45) Date of Patent: Nov. 26, 2019

(54) POST FOR A TOOL WAGON AND A TOOL WAGON INCLUDING THE SAME

(71) Applicants: Ying-Chieh Liao, Taichung (TW); Yu-Kuo Liao, Taichung (TW)

(72) Inventors: Ying-Chieh Liao, Taichung (TW); Yu-Kuo Liao, Taichung (TW)

( * ) Notice: Subject to any disclaimer, the term of this patent is extended or adjusted under 35 U.S.C. 154(b) by 197 days.

(21) Appl. No.: 15/865,820

(22) Filed: Jan. 9, 2018

(65) Prior Publication Data
US 2018/0251144 A1    Sep. 6, 2018

(30) Foreign Application Priority Data

Mar. 2, 2017    (TW) .............................. 106106878 A (51) Int. Cl.
*B62B 3/02*    (2006.01)

(52) U.S. Cl.
CPC ...................................... *B62B 3/02* (2013.01)

(58) Field of Classification Search
CPC ............ B62B 3/00; B62B 3/002; B62B 3/003
See application file for complete search history.

(56) References Cited

U.S. PATENT DOCUMENTS

| 3,380,768 | A | * | 4/1968 | Wolfensberger | ... A47B 47/0008 312/140 |
| 3,763,681 | A | * | 10/1973 | Flintoft | .................. B21B 23/00 29/890.03 |
| 3,892,189 | A | * | 7/1975 | Killam | .................. A47B 47/021 108/109 |
| D257,503 | S | * | 11/1980 | McKee | ......................... D25/122 |
| D257,666 | S | * | 12/1980 | McKee | ......................... D25/122 |
| RE30,664 | E | * | 7/1981 | Upton | ..................... B60P 3/343 135/142 |
| 4,620,637 | A | * | 11/1986 | Karashima | ............. A47B 96/00 211/126.1 |
| 4,768,845 | A | * | 9/1988 | Yeh | ..................... A47B 47/0008 312/257.1 |
| 5,035,349 | A | * | 7/1991 | Donahue | .............. B65D 35/242 222/107 |
| 5,339,588 | A | * | 8/1994 | Ballstadt | ................... E04C 1/42 52/308 |
| 5,695,205 | A | * | 12/1997 | Liu | ..................... A47B 87/0246 211/189 |

(Continued)

FOREIGN PATENT DOCUMENTS

| TW | M303862 U | 1/2007 |
| TW | M324015 U | 12/2007 |

*Primary Examiner* — James A Shriver, II
*Assistant Examiner* — Vaughn Coolman
(74) *Attorney, Agent, or Firm* — Muncy, Geissler, Olds & Lowe, P.C.

(57) ABSTRACT

A post of a tool wagon is provided, including a hollow structure thereinside, further including at least one slide, each of the at least one slide extending along a lengthwise direction of the post, each of the at least one slide being configured for a partition to be slidably installed thereto, wherein at least one said slide is configured with at least one engagement mechanism disposed therewithin, each of the at least one engagement mechanism includes a through opening arranged on the post and a blocking portion, the blocking portion extends in the hollow structure. A tool wagon is also provided, including a plurality of the posts described above.

11 Claims, 7 Drawing Sheets

(56) References Cited

U.S. PATENT DOCUMENTS

| | | | | |
|---|---|---|---|---|
| 6,247,770 | B1 * | 6/2001 | Glass | A47B 57/44 |
| | | | | 108/107 |
| 6,470,613 | B1 * | 10/2002 | Wildrick | G09F 3/20 |
| | | | | 40/649 |
| 6,767,019 | B2 * | 7/2004 | van Hekken | B62B 3/006 |
| | | | | 108/147.12 |
| D547,462 | S * | 7/2007 | Petta | D25/122 |
| D577,874 | S * | 9/2008 | Mayer | D34/27 |
| D587,421 | S * | 2/2009 | Liao | D25/119 |
| 8,113,489 | B1 * | 2/2012 | Harder | E04F 11/1834 |
| | | | | 256/22 |
| 8,616,661 | B2 * | 12/2013 | Takata | H02B 1/28 |
| | | | | 312/140 |
| 8,657,129 | B2 * | 2/2014 | Marks | G10D 13/00 |
| | | | | 211/195 |
| 9,145,698 | B2 * | 9/2015 | Korbel | E04H 4/14 |
| 9,216,753 | B2 * | 12/2015 | Bryan | B62B 3/02 |
| D763,534 | S * | 8/2016 | Liao | D34/21 |
| 10,011,986 | B2 * | 7/2018 | White | E04B 9/006 |
| 2004/0066012 | A1 * | 4/2004 | Choi | B62B 3/02 |
| | | | | 280/47.35 |
| 2005/0000168 | A1 * | 1/2005 | Wright | E04B 2/7427 |
| | | | | 52/36.1 |
| 2010/0242327 | A1 * | 9/2010 | Smith | A47F 7/14 |
| | | | | 40/735 |
| 2010/0310893 | A1 * | 12/2010 | Derbyshire | B32B 21/02 |
| | | | | 428/528 |
| 2012/0060820 | A1 * | 3/2012 | Sikkenga | B01D 45/08 |
| | | | | 126/1 R |
| 2012/0145661 | A1 * | 6/2012 | Fernandez | A47B 96/06 |
| | | | | 211/123 |
| 2012/0255925 | A1 * | 10/2012 | Fernandez | A47B 57/42 |
| | | | | 211/134 |

\* cited by examiner

POST FOR A TOOL WAGON AND A TOOL WAGON INCLUDING THE SAME

BACKGROUND OF THE INVENTION

Field of the Invention

The present invention relates to a post for a tool wagon and a tool wagon including the same.

Description of the Prior Art

Tool wagons are used in factories, restaurants, etc. in daily life. The tool wagons can storage all objects and be moved to predetermined places quickly, so as to enjoy customers' high praise. Frame of conventional tool wagon is usually connected with the body of tool wagon by welding. Because of manufacturing process of the welding is more complicated, manufacturer uses posts to assemble to other components instead of the frame of conventional tool wagon, such as the tool wagon disclosed in TW M303862. However, each joint portions of the frame is joined by a screwing member, so as to prevent the frames from being separated from each other. Thus, it is not convenient to assemble, and not fast enough in screwing process. Moreover, the screwing members are easily lost or missing.

To solve the problems mentioned above, partial manufacturers insert other components into the post to fit tight to form a frame such as glove boards and posts, push handles and posts. Thereby, users can assemble the tool wagon more quickly, as shown in TW M324015.

However, the structure described mentioned above also has deficiencies. When overloading, the tool wagon is hard to connect the posts with glove boards, push handles, or other components tightly only by tight-fitting method. The glove boards, push handles, or other components are easily detached from the posts so that it is not convenient for using.

The present invention is, therefore, arisen to obviate or at least mitigate the above mentioned disadvantages.

SUMMARY OF THE INVENTION

An object of the present invention is to provide a post for a tool wagon and a tool wagon including the same, in which in the condition of easy assembly, it can enhance the stability of the combination of the post and other components by engagement mechanism, so as to provide the tool wagon with a higher loading capacity.

To achieve the above and other objects, a post for a tool wagon is provided, including a hollow structure thereinside, further including at least one slide, each of the at least one slide extending along a lengthwise direction of the post, each of the at least one slide being configured for a partition to be slidably installed thereto, wherein at least one said slide is configured with at least one engagement mechanism disposed therewithin, each of the at least one engagement mechanism includes a through opening arranged on the post and a blocking portion, the blocking portion extends in the hollow structure.

To achieve the above and other objects, a tool wagon is further provided, including the plurality of post mentioned above, further including: a frame, including the plurality of posts and at least one laminate assembly which are inserted into each other, and form a storage space; a plurality of partitions, respectively disposed slidably between the slides which are respectively disposed on adjacent two of the posts, the partition being transverse to the laminate assembly; a handle unit, inserted into the plurality of posts; and a wheel unit, assembled to the frame.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
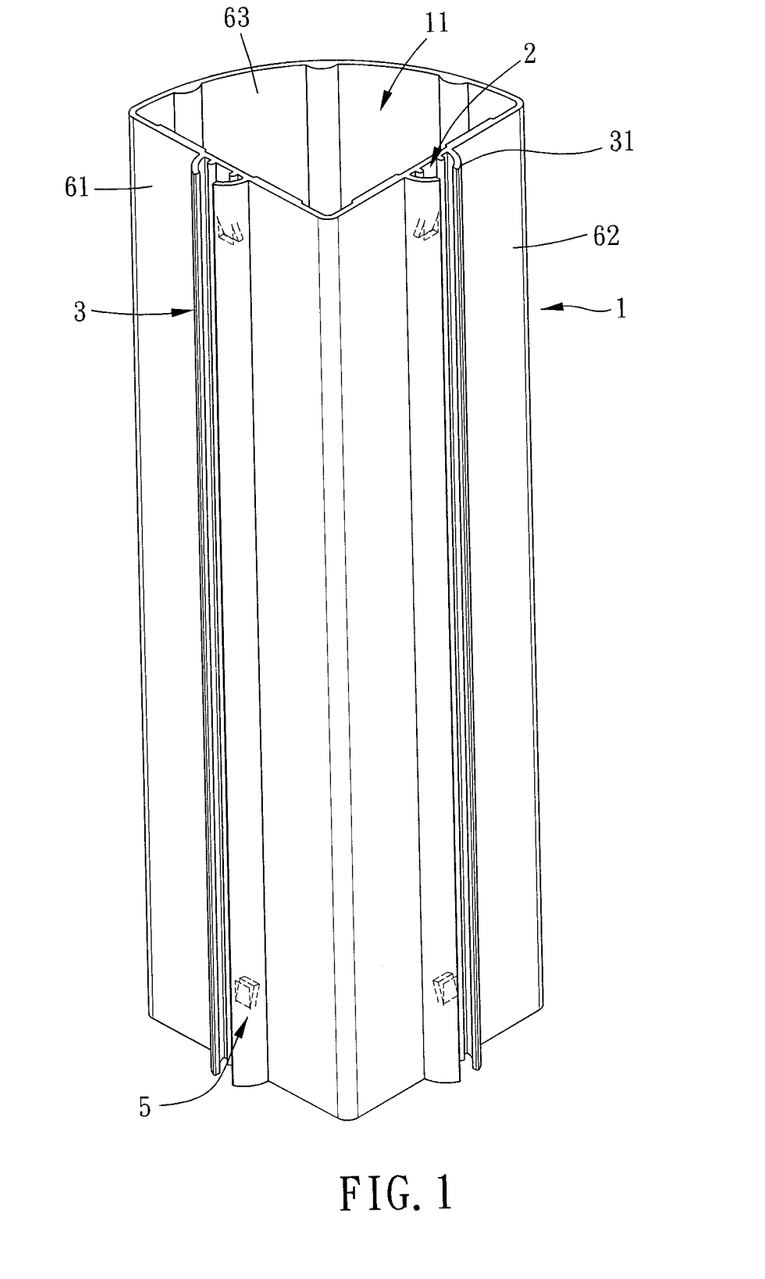
FIG. 1 is a perspective view of a post for a tool wagon according to a preferred embodiment of the present invention.
Figure 2:
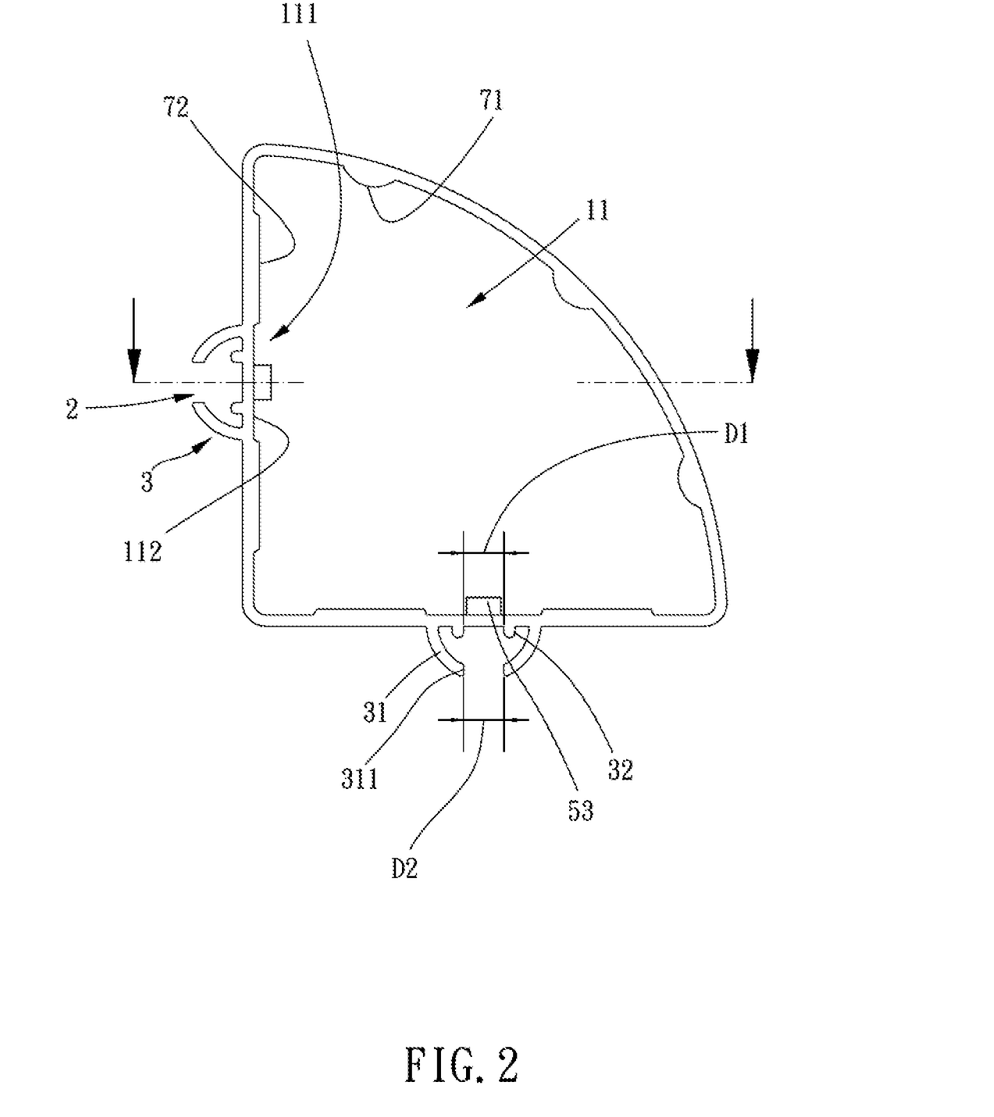
FIG. 2 is a top plan enlarged view of the FIG. 1.
Figure 3:
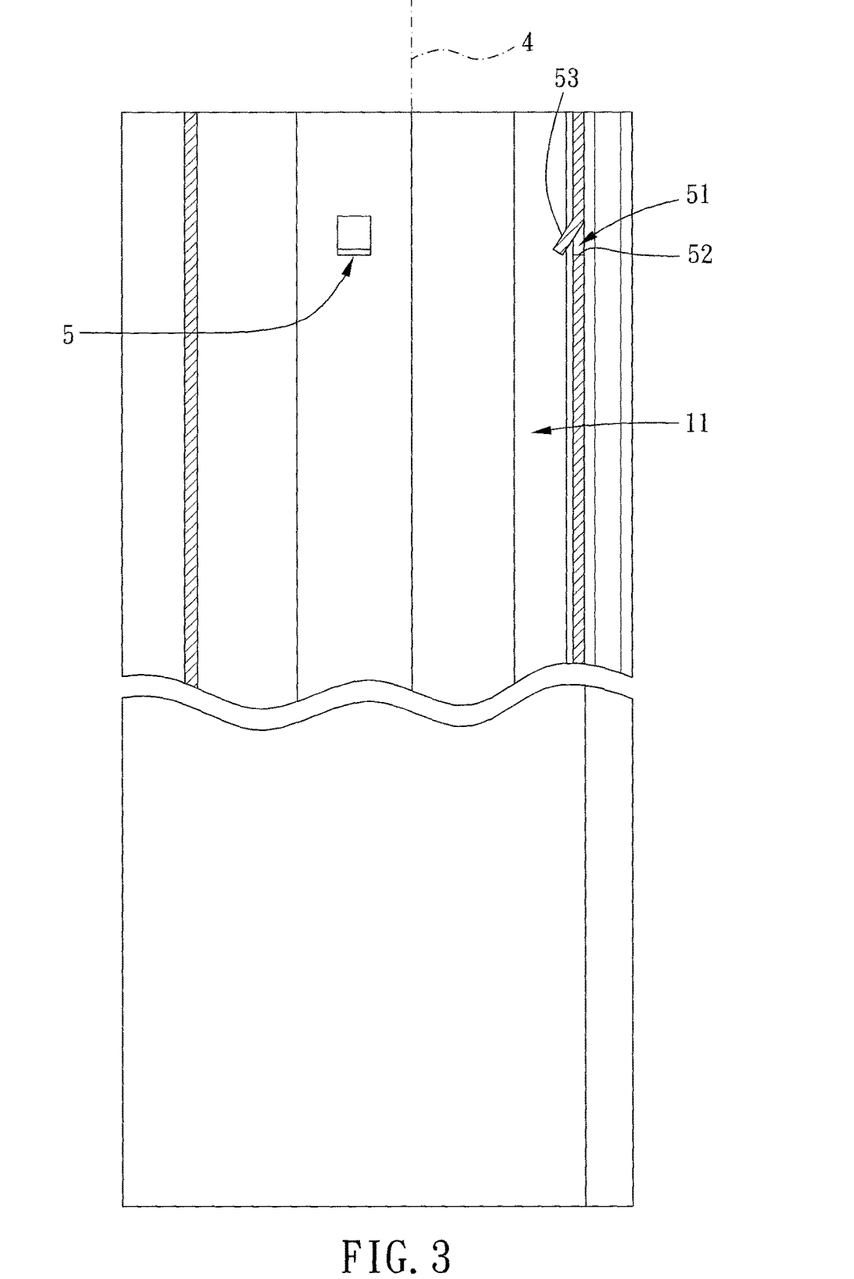
FIG. 3 is a partially-enlarged side view of FIG. 1.
Figure 4:
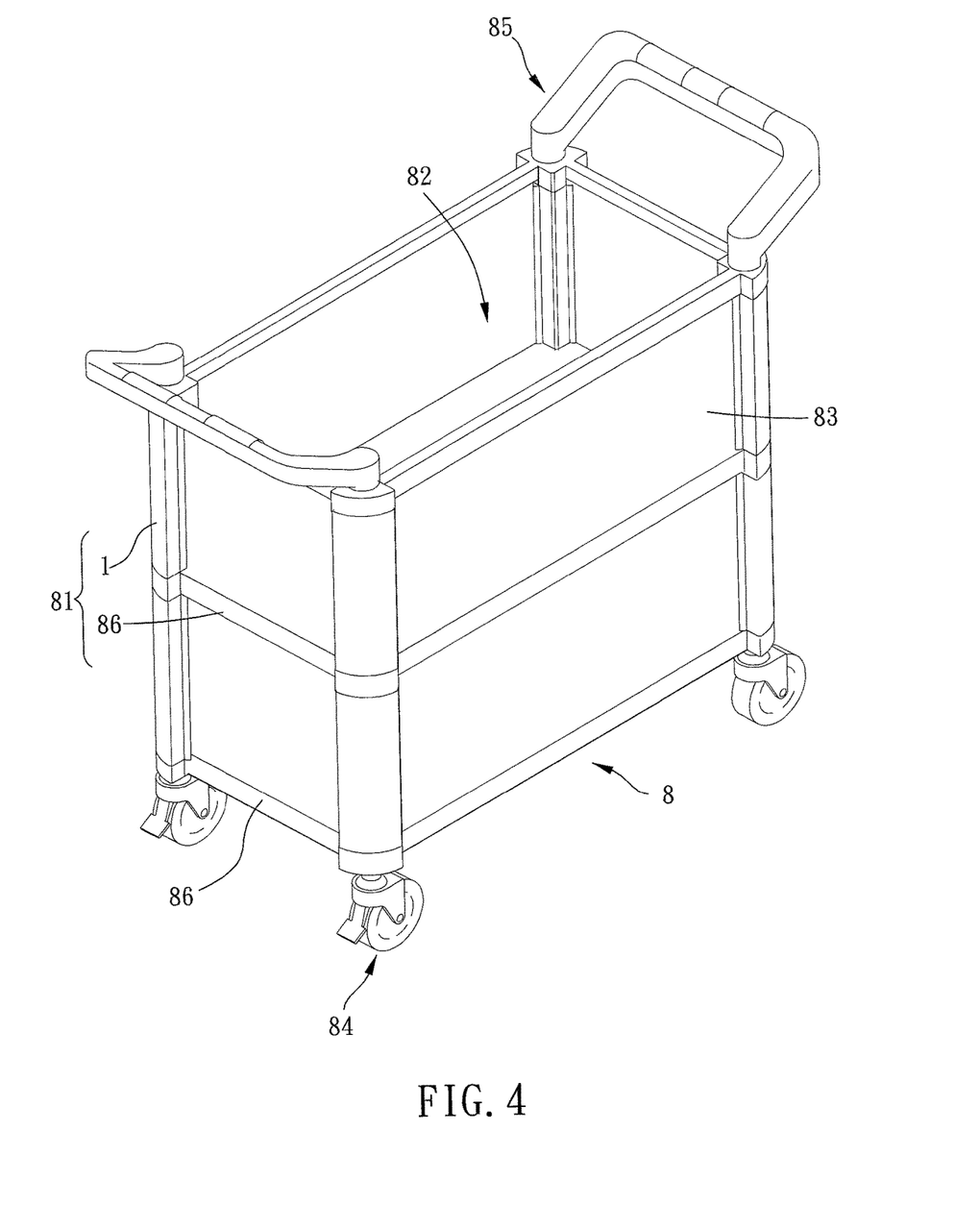
FIG. 4 is a perspective view of a tool wagon.
Figure 5:
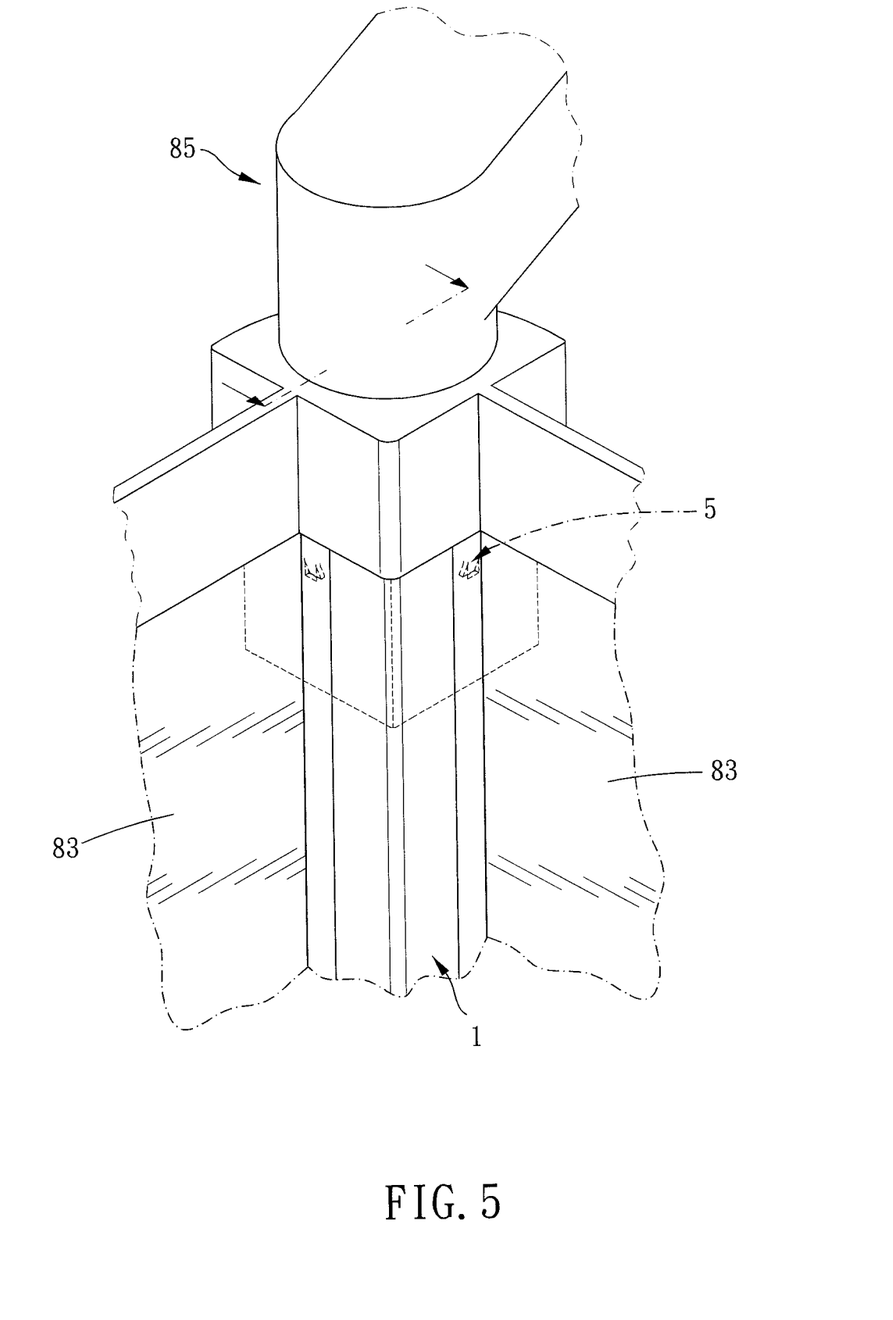
FIG. 5 is a partially-enlarged view of FIG. 4.
Figure 6:
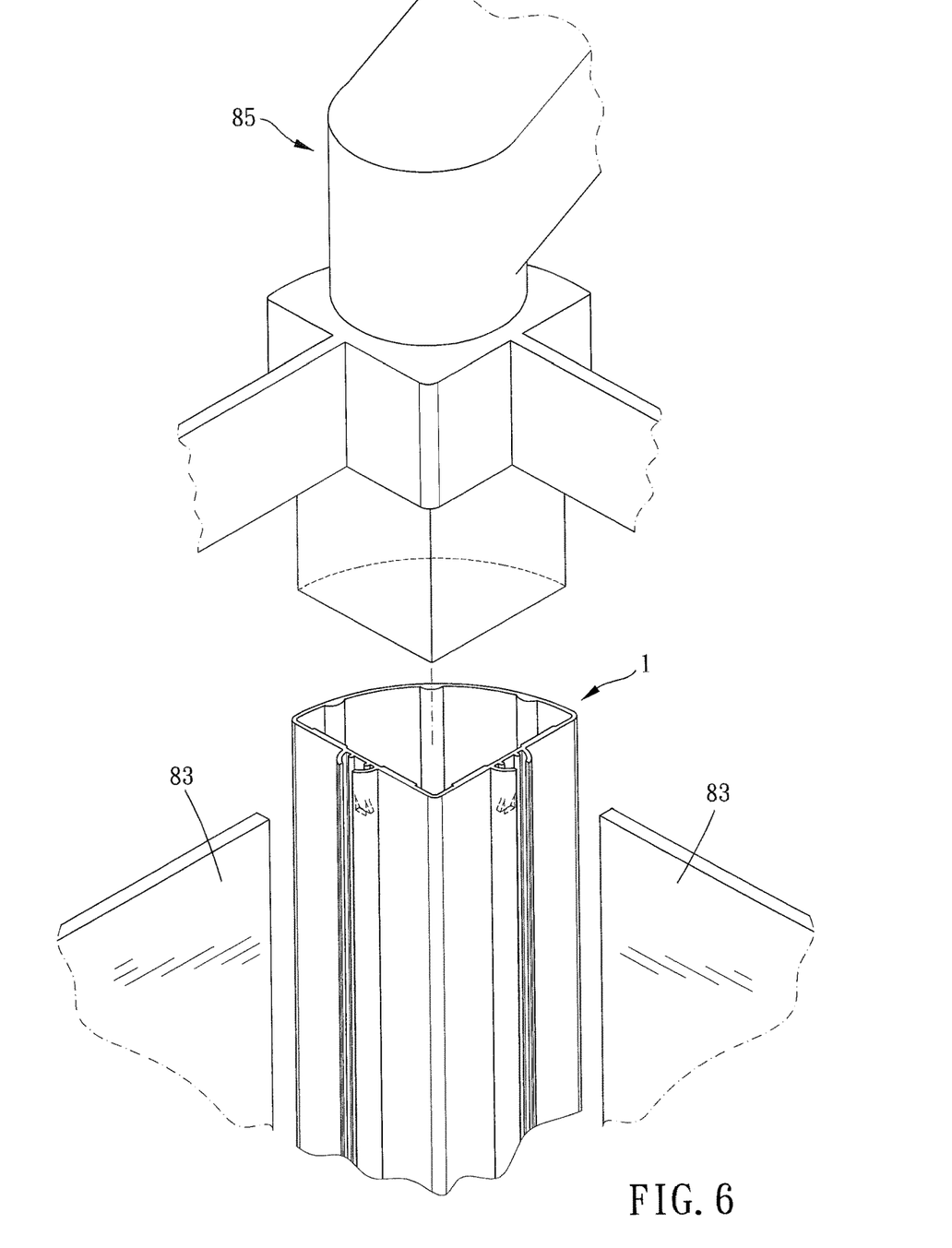
FIG. 6 is a breakdown view of FIG. 5.
Figures 7, 8:
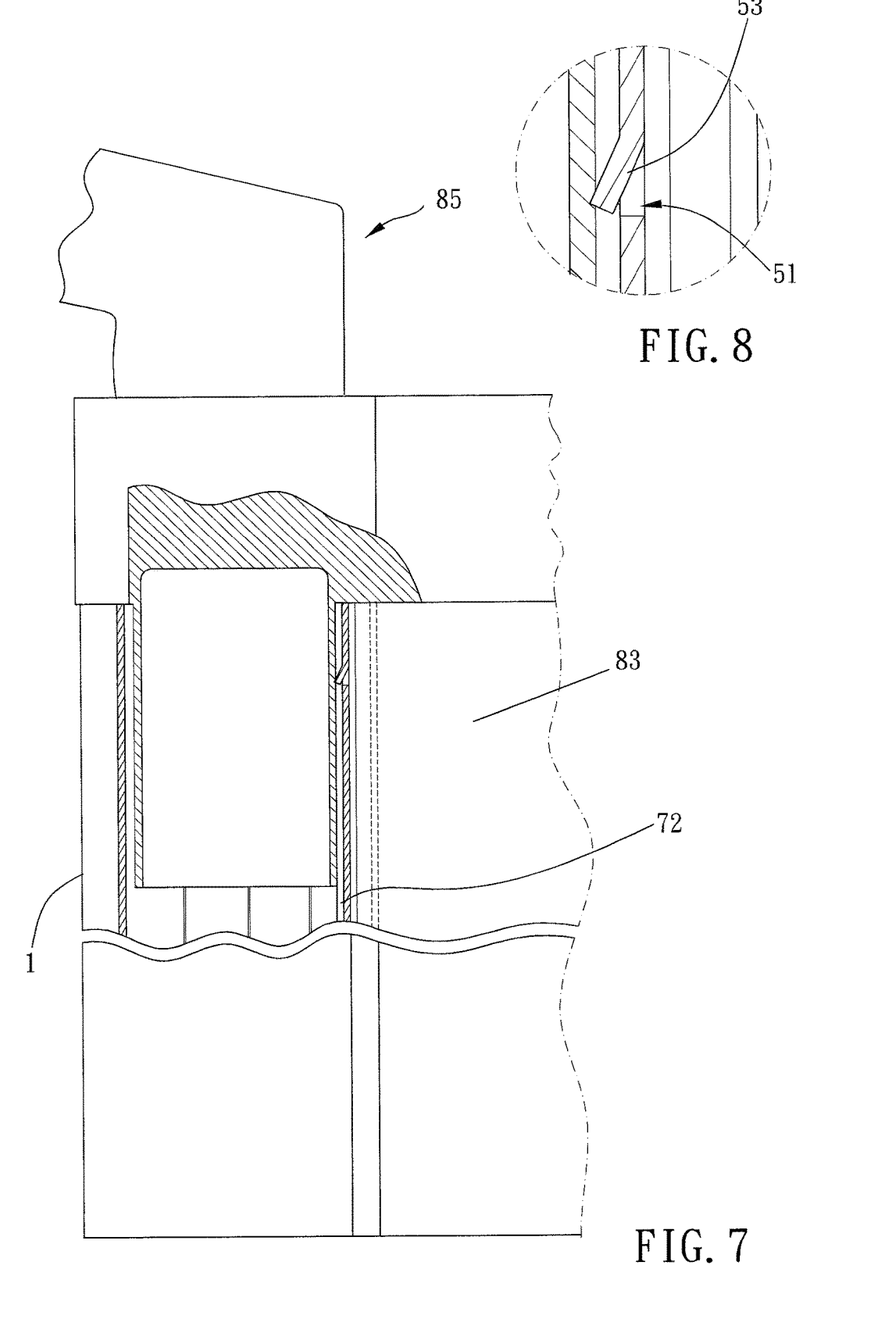
FIG. 7 is a partial cross-sectional view of FIG. 5.
FIG. 8 is a partially-enlarged view of FIG. 7.

FIGS. 1 to 8 show a post for a tool wagon and a tool wagon including the same according to a preferred embodiment of the present invention. Specifically, the post 1 for a tool wagon includes a hollow structure 11 thereinside. The post 1 further includes at least one slide 2, each of the at least one slide 2 extends along a lengthwise direction 4 of the post 1. Each of the at least one slide 2 is configured for a partition 83 to be slidably installed thereto. Wherein at least one said slide 2 is configured with at least one engagement mechanism 5 disposed therewithin, each of the at least one engagement mechanism 5 includes a through opening 51 arranged on the post and an blocking portion 53, the blocking portion 53 extends in the hollow structure 11.

Specifically, the assembly component such as connection member, handle, wheel, etc. can be inserted into the hollow structure 11 along the lengthwise direction 4 so that the blocking portion 53 can laterally abut against one of the connection members (moreover, the blocking portion 53 even can partially insert into the assembly component). Thus, the assembly component and the post 1 can be connected with each other tightly.

Specifically, the blocking portion 53 extends from a wall 52 which defines the through opening 51 toward a center of the post 1. Thus, an extending direction of blocking portion 53 and an inserting direction of the assembly component are the same direction. In this manner, the assembly component can smoothly pass through the blocking portion 53 when inserting the assembly component into the post 1. Moreover, when the assembly component is moved backwards to disengage from the post 1, the blocking portion 53 not only can provide frictional resistance by abutting laterally, but also interfere with the assembly component in the lengthwise direction 4, to prevent the assembly component from being moved. In other words, it can provide a better stability of the connection of the post 1 and the assembly component to resist a greater outer force and have a better loading capacity. Preferably, plans which are respectively having the blocking portion 53 and the through opening 51 have an angle therebetween, a range of the angle is 20.00 to 50.00, so as to provide greater interference effect.

The blocking portion 53 can be multiple shapes. In this embodiment, the blocking portion 53 and the through opening 51 are complementary to each other, so as to recognize the shape of the blocking portion 53 by viewing the shape of the through opening 51. Thus, it is easy to classify the post when producing. To achieve this purpose, each of the at least one engagement mechanism 5 is formed by extrusion processing, so as to simplify the manufacturing process and improve the producing efficiency. Furthermore, the blocking portion 53 is polygonal so as to interfere with the assembly component more easily, or easily be pressed into the assembly component through an edge portion of the blocking portion 53 to provide strong connection.

It is to be noted that the arrangement of the at least one engagement mechanism 5 which is arranged within the slide 2. When the partition 83 is installed slidably to the slide 2, the partition 83 can totally cover the at least one engagement mechanism 5 to prevent a burr or a sharp face which is formed by extrusion processing of the through opening 51 from hurting people, and to enhance the overall appearance of the combinational structure and a better visual appearance. Equally, the slide 2 has the same efficiency, to prevent a human body from being hurt when assembling or holding the post 1.

The following is the further structure specification of the post 1. The post 1 further includes a first wall portion 61, a second wall portion 62 and a third wall portion 63 which are connected with one another and define the hollow structure 11. Wherein a number of the at least one slide 2 is two, and the two slides 12 are respectively disposed on the first and second wall portions 61, 62. A number of the at least one engagement mechanism 5 is four, two pair of the four engagement mechanisms 5 are respectively arranged on the two opposite ends of the slide 2.

Preferably, the post 1 further includes at least one first reinforcing rib 71 and at least two second reinforcing ribs 72, so as to strong the structure strength to resist unpredictable impact force. Wherein the at least one first reinforcing rib 71 is disposed on an inner face of the third wall portion 63 and extends along the lengthwise direction 4, and the at least two second reinforcing rib 72 are respectively disposed on inner faces of the first and second wall portions 61, 62 along the lengthwise direction 4. Besides improving the overall structural strength of the post 1, each of the first and second reinforcing ribs 71, 72 can respectively laterally abut against the assembly component to have the tight connection, so as to improve the connection of the assembly component and the post 1.

Furthermore, as viewed in the lengthwise direction 4, the first and second wall portions 61, 62 respectively extend in a straight line, the third wall portion 63 is arc-shaped, so that the first, second and third wall portions 61, 62, 63 define a one-fourth circle of the hollow structure 11. Wherein, a number of the at least one first reinforcing rib 71 is three, the three first reinforcing ribs 71 are equiangularly arranged on the third wall portion 63. And a number of at least two second reinforcing ribs 72 is four. The first and second wall portions 61, 62 respectively have two of the second reinforcing ribs 72. As viewed in the lengthwise direction 4, the slide 2 is disposed between the two second reinforcing ribs 72, and the slide 2 and the two second reinforcing ribs 72 are disposed in a staggered arrangement and not overlapped with each other. Therefore, each of the first and second reinforcing ribs 71, 72 can provide the abutting force for the assembly component equally in a circumferential direction, so as to increase the stability of the connection.

In each of the embodiments, the first reinforcing rib 71 is arc-convex-shaped, each of the two second reinforcing ribs 72 is trapezoid-shaped. And a width of each of the two second reinforcing ribs 72 is greater than 2 times a width of each of the first reinforcing rib 71. In addition, the first portion 61, 62 is identical to the second wall portion 62. A ratio of the width of the first wall portion 61 to the maximum width of the blocking portion 53 is 11.00 to 17.00 (in this embodiment, the ratio is substantially 14.00).

It is to be noted that the post 1 of this embodiment is formed by extrusion processing, so as to have advantages of uniform material distribution, fixed cross-sectional shape and fluency manufacture of manufacturing complex structures. In addition, to take the use of environmental requirements (such as a corrosion resistant) and the speed of processing output (for example, easy to stretch molding) into account, the post 1 is made of aluminum material.

Preferably, the post 1 further includes at least one wall unit 3, a number of the wall unit 3 is equal to the number of the at least one slide 2. Specifically, each of the at least one wall unit 3 includes two wing portions configured for the partition 83 to be abutted against laterally. The slide 2 is arranged between the two wing portions 31, thus the two wing portions 31 can further clamp the partition 83 so that the partition 83 cannot be easy swayed. More specifically, as viewed in the lengthwise direction 4, each of the two wing portions 31 extends toward each other and is arc-shaped, and center lines of the blocking portion 53, the slide 2 and the two wing portions 31 are the same. Specifically, each of the at least one slide 2 corresponds to one of the blocking portion 53 of the at least one engagement mechanism 5. An inner wall of the hollow structure 11 has at least one recessed portion 111 extending along the lengthwise direction of the post 1, each of the through opening 51 of the at least one engagement mechanism is formed at a bottom 112 of one of the at least one recessed portion 111, and each of the blocking portion 53 of the at least one engagement mechanism integrally extends inwardly from the bottom 112 of one of the at least one recessed portion 111. Each of the inner faces of the first and second wall portions has one of the recessed portion 111 which is connected with one of the at least two second reinforcing ribs 72. Each recessed portion 111 is defined between two of the second reinforcing ribs 72. Each of the at least one wall unit further includes two positioning ribs 32 projecting from the outer face of the post, located between of the two wing portions 31 and extending along the lengthwise direction of the post, and a distance D1 between the two positioning ribs 32 is equal to a distance D2 between two distal ends 311 between the two wing portions 31.

The present invention further includes a tool wagon 8. Please refer to FIG. 4 for overall structure of the tool wagon. The tool wagon 8 not only includes a plurality of posts 1, but also further includes a frame 81, a plurality of partitions 83, a handle unit 85 and a wheel unit 84.

The frame 81 is formed by the plurality of posts 1 and at least one laminate assembly 86 which are inserted into each other. The frame 81 form a storage space 82, the storage space 82 is adapted for loading objects. The plurality of partitions 83 are respectively disposed slidably between the slides 2 which are respectively disposed on adjacent two of the posts 1. The partition 83 is transverse to the laminate assembly 86, so as to restrict the objects within the storage space 82, and not to be dropped from the storage space 82 when swaying. The handle unit 85 is inserted into the plurality of posts 1 for hands to hold. The wheel unit 84 is assembled to the frame 81 for moving quickly. Understandably, in this embodiment, each of the laminate assembly 86, the handle unit 85 or the wheel units 84 are the assembly component.

Given the above, the tool wagon of the post can be connected with other assembly component more stably through the design of the engagement mechanism. Thus, the assembly component inserted into the post is not easy to disengage from the post, and to improve the durability, stability, loading capacity of the overall structure after combination. Because of the arrangement of the engagement mechanism arranged within the slide, the engagement mechanism can prevent a burr or a sharp face formed by extrusion processing from hurting people, and the overall appearance of the tool wagon after the combination has a better visual appearance.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A post for a tool wagon, including a hollow structure thereinside, further including at least one slide on an outer face of the post and at least one engagement mechanism within the hollow structure, each of the at least one slide extending along a lengthwise direction of the post, each of the at least one slide being configured for a partition to be slidably installed thereto, wherein each of the at least one engagement mechanism includes a through opening arranged on the post and a blocking portion, the blocking portion extends in the hollow structure;

wherein each of the at least one slide corresponds to one of the blocking portion of the at least one engagement mechanism;

wherein an inner wall of the hollow structure has at least one recessed portion extending along the lengthwise direction of the post, each of the through opening of the at least one engagement mechanism is formed at a bottom of one of the at least one recessed portion, and each of the blocking portion of the at least one engagement mechanism integrally extends inwardly from the bottom of one of the at least one recessed portion.

2. The post for the tool wagon of claim 1, further including a first wall portion, a second wall portion and a third wall portion which are connected with one another and define the hollow structure, a number of the at least one slide being two, and the two slides being respectively disposed on the first and second wall portions.

3. The post for the tool wagon of claim 2, further including at least one first reinforcing rib and at least two second reinforcing ribs, the at least one first reinforcing rib disposed on an inner face of the third wall portion and extending along the lengthwise direction, and the at least two second reinforcing ribs respectively disposed on inner faces of the first and second wall portions and extending along the lengthwise direction, wherein each of the inner faces of the first and second wall portions has one of the recessed portion which is connected with one of the at least two second reinforcing ribs.

4. The post for the tool wagon of claim 3, wherein a number of the at least two second reinforcing ribs is four, the first and second wall portions respectively have two of the second reinforcing ribs, as viewed in the lengthwise direction, the slide is disposed between the two second reinforcing ribs, the slide and the two second reinforcing ribs are disposed in a staggered arrangement and not overlapped with each other, and each recessed portion is defined between two of the second reinforcing ribs.

5. The post for the tool wagon of claim 4, further including at least one wall unit, a number of the wall unit being equal to a number of the at least one slide, each of the at least one wall unit including two wing portions configured for the partition to be abutted laterally, the slide being arranged between the two wing portions; as viewed in the lengthwise direction, each of the two wing portions extending toward each other and being arc-shaped; the first wall portion is identical to the second wall portion, a ratio of a width of the first wall portion to a maximum width of the blocking portion being 11.00 to 17.00; the blocking portion and the through opening being complementary to each other, the blocking portion being polygonal; the blocking portion extending from a wall which defines the through opening toward a center of the post; the post formed by extrusion processing; the post being made of aluminum material; each of the at least one engagement mechanism formed by extrusion processing; as viewed in the lengthwise direction, the first and second wall portions respectively extending in a straight line, the third wall portion being arc-shaped, the first, second and third wall portions defining a one-fourth circle of the hollow structure; a number of the at least one first reinforcing rib being three; each of the three first reinforcing ribs respectively being arc-convex-shaped, each of the two second reinforcing ribs being trapezoid-shaped; the three first reinforcing ribs equiangularly arranged on the third wall portion; a width of each of the two second reinforcing ribs being greater than 2 times a width of each of the first reinforcing rib; a number of the at least one engagement mechanism being four, two pair of the four engagement mechanisms respectively arranged on the two opposite ends of the slide; center lines of the blocking portion, the slide and the two wing portions being the same; and planes which are respectively having the blocking portion and the through opening having an angle therebetween, a range of the angle being 20.00 to 50.00.

6. The post for the tool wagon of claim 2, wherein the first wall portion is identical to the second wall portion, and a ratio of a width of the first wall portion to a maximum width of the blocking portion is 11.00 to 17.00.

7. The post for the tool wagon of claim 1, further including at least one wall unit, a number of the at least one wall unit being equal to a number of the at least one slide, each of the at least one wall unit including two wing portions configured for the partition to be abutted laterally, and the slide being arranged between the two wing portions.

8. The post for the tool wagon of claim 7, wherein each of the at least one wall unit further includes two positioning ribs projecting from the outer face of the post, located between of the two wing portions and extending along the lengthwise direction of the post, and a distance between the two positioning ribs is equal to a distance between two distal ends between the two wing portions.

9. The post for the tool wagon of claim 1, wherein the blocking portion and the through opening are complementary to each other, and the blocking portion is polygonal.

10. The post for the tool wagon of claim 1, wherein the blocking portion extends from a wall which defines the through opening toward a center of the post.

11. A wagon, including a plurality of said posts of claim 1, further including:

a frame, including the plurality of said posts and at least one laminate assembly which are inserted into each other, and form a storage space;

a plurality of partitions, respectively disposed slidably between the slides which are respectively disposed on an adjacent two of the posts, the partition being transverse to the laminate assembly;
a handle unit, inserted into the plurality of said posts; and
a wheel unit, assembled to the frame.

* * * * *